United States Patent
McPherson et al.

(10) Patent No.: US 11,695,840 B2
(45) Date of Patent: Jul. 4, 2023

(54) DYNAMICALLY ROUTING CODE FOR EXECUTING

(71) Applicant: Amazon Technologies, Inc., Seattle, WA (US)

(72) Inventors: George Steven McPherson, Seattle, WA (US); Mehul A. Shah, Saratoga, CA (US); Supratik Chakraborty, San Jose, CA (US); Prajakta Datta Damle, San Jose, CA (US); Gopinath Duddi, San Jose, CA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/694,585

(22) Filed: Mar. 14, 2022

(65) Prior Publication Data

US 2022/0279049 A1 Sep. 1, 2022

Related U.S. Application Data

(63) Continuation of application No. 15/385,784, filed on Dec. 20, 2016, now Pat. No. 11,277,494.
(Continued)

(51) Int. Cl.
| | |
|---|---|
| *H04L 67/00* | (2022.01) |
| *H04L 67/10* | (2022.01) |
| *G06F 9/50* | (2006.01) |
| *G06F 9/4401* | (2018.01) |
| *H04L 67/01* | (2022.01) |

(52) U.S. Cl.
CPC ............ *H04L 67/34* (2013.01); *G06F 9/4411* (2013.01); *G06F 9/5005* (2013.01); *G06F 9/5072* (2013.01); *H04L 67/01* (2022.05); *H04L 67/10* (2013.01)

(58) Field of Classification Search
CPC ....... H04L 67/34; H04L 67/10; G06F 9/5005; G06F 9/5072
See application file for complete search history.

(56) References Cited

U.S. PATENT DOCUMENTS

| | | |
|---|---|---|
| 8,136,158 B1 | 3/2012 | Sehr et al. |
| 8,458,691 B2 | 6/2013 | Fellenstein et al. |
| (Continued) | | |

OTHER PUBLICATIONS

Oracle: "Triggers-Oracle Database Concepts", Retrieved from URL: https://Web.archive.org/web/20150918220843/https://docs.oracle.com/cd/B19306_01/server.102/b14220/triggers.htm, retrieved on Jan. 11, 2018, pp. 1-17.

(Continued)

*Primary Examiner* — Shirley X Zhang
(74) *Attorney, Agent, or Firm* — S. Scott Foster; Kowert, Hood, Munyon, Rankin & Goetzel, P.C.

(57) ABSTRACT

Code may be dynamically routed to computing resources for execution. Code may be received for execution on behalf of a client. Execution criteria for the code may be determined and computing resources that satisfy the execution criteria may be identified. The identified computing resources may then be procured for executing the code and then the code may be routed to the procured computing resources for execution. Permissions or authorization to execute the code may be shared to ensure that computing resources executing the code have the same permissions or authorization when executing the code.

20 Claims, 10 Drawing Sheets

Related U.S. Application Data

(60) Provisional application No. 62/426,584, filed on Nov. 27, 2016.

(56) References Cited

U.S. PATENT DOCUMENTS

| | | | |
|---|---|---|---|
| 8,752,047 | B2 | 6/2014 | Banga et al. |
| 9,361,145 | B1* | 6/2016 | Wilson ................... G06F 13/28 |
| 9,471,775 | B1 | 10/2016 | Wagner et al. |
| 9,632,836 | B2 | 4/2017 | Michel et al. |
| 9,684,785 | B2 | 6/2017 | Walsh |
| 9,760,376 | B1* | 9/2017 | Bequet ................. G06F 9/5027 |
| 9,800,517 | B1* | 10/2017 | Anderson ............... H04L 67/10 |
| 10,545,979 | B2 | 1/2020 | McPherson et al. |
| 10,621,210 | B2 | 4/2020 | Shah et al. |
| 10,963,479 | B1 | 3/2021 | Shah et al. |
| 11,036,560 | B1* | 6/2021 | Mcpherson ........... G06F 16/254 |
| 11,138,220 | B2 | 10/2021 | Shah et al. |
| 11,277,494 | B1 | 3/2022 | McPherson et al. |
| 2003/0196193 | A1 | 10/2003 | Kuzmin |
| 2005/0283622 | A1 | 12/2005 | Hall et al. |
| 2006/0152756 | A1 | 7/2006 | Fellenstein et al. |
| 2007/0203719 | A1 | 8/2007 | Kenagy et al. |
| 2007/0240161 | A1 | 10/2007 | Prabhakar et al. |
| 2007/0266426 | A1 | 11/2007 | Iyengar et al. |
| 2008/0052534 | A1 | 2/2008 | Harada et al. |
| 2008/0098375 | A1 | 4/2008 | Isard |
| 2008/0104014 | A1 | 5/2008 | Burger et al. |
| 2008/0147673 | A1 | 6/2008 | Candea |
| 2009/0177671 | A1 | 7/2009 | Pellegrini et al. |
| 2009/0192979 | A1 | 7/2009 | Lunde |
| 2010/0058291 | A1 | 3/2010 | Hahn et al. |
| 2010/0274750 | A1 | 10/2010 | Oltean et al. |
| 2011/0023028 | A1 | 1/2011 | Nandagopal et al. |
| 2011/0107383 | A1 | 5/2011 | Barton et al. |
| 2011/0145392 | A1 | 6/2011 | Dawson et al. |
| 2011/0154431 | A1 | 6/2011 | Walsh |
| 2011/0265069 | A1 | 10/2011 | Fee et al. |
| 2012/0042162 | A1 | 2/2012 | Anglin et al. |
| 2012/0054744 | A1 | 3/2012 | Singh et al. |
| 2012/0096468 | A1* | 4/2012 | Chakravorty ............. G06F 9/50 718/103 |
| 2012/0203877 | A1 | 8/2012 | Bartholomay et al. |
| 2013/0167222 | A1 | 6/2013 | Lewis |
| 2013/0290928 | A1 | 10/2013 | Johnson |
| 2013/0346993 | A1* | 12/2013 | Chen ..................... G06F 9/5072 718/103 |
| 2015/0100542 | A1 | 4/2015 | Li et al. |
| 2015/0113009 | A1 | 4/2015 | Zhou et al. |
| 2015/0163162 | A1* | 6/2015 | DeCusatis ............... H04L 67/10 709/224 |
| 2015/0286701 | A1 | 10/2015 | Wideman |
| 2015/0347541 | A1 | 12/2015 | Holmes et al. |
| 2015/0356293 | A1 | 12/2015 | Biswas |
| 2016/0180084 | A1 | 6/2016 | Spurlock et al. |
| 2016/0224360 | A1 | 8/2016 | Wagner et al. |
| 2016/0224785 | A1 | 8/2016 | Wagner et al. |
| 2016/0259628 | A1 | 9/2016 | Schuchman et al. |
| 2016/0314020 | A1 | 10/2016 | Miller et al. |
| 2016/0360009 | A1 | 12/2016 | Borley et al. |
| 2017/0126795 | A1 | 5/2017 | Kumar et al. |
| 2017/0213037 | A1 | 6/2017 | Toledano et al. |
| 2017/0223115 | A1 | 8/2017 | Childs et al. |
| 2018/0129497 | A1 | 5/2018 | Biddle et al. |
| 2018/0157703 | A1 | 6/2018 | Wang et al. |
| 2018/0157842 | A1 | 6/2018 | Holz et al. |
| 2018/0189350 | A1 | 7/2018 | Imaki |
| 2018/0189510 | A1 | 7/2018 | Seko |
| 2018/0276781 | A1 | 9/2018 | Oliveria et al. |

OTHER PUBLICATIONS

Bratko, A. et al., "Exploiting Structural Information for semi-structured document categorization", Information Processing & Management, Dated May 1, 2006, vol. 42, No. 3, pp. 679-694.

Juan Trujillo et al., "A UML Based Approach for Modeling ETL Processes in data warehouses", in: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.

U.S. Appl. No. 17/491,985, filed Oct. 1, 2021, Mehul A. Shah, et al.
U.S. Appl. No. 15/385,787, filed Dec. 20, 2016, George Steven McPherson, et al.
U.S. Appl. No. 16/752,022, filed Jan. 24, 2020, George Steven McPherson, et al.

\* cited by examiner

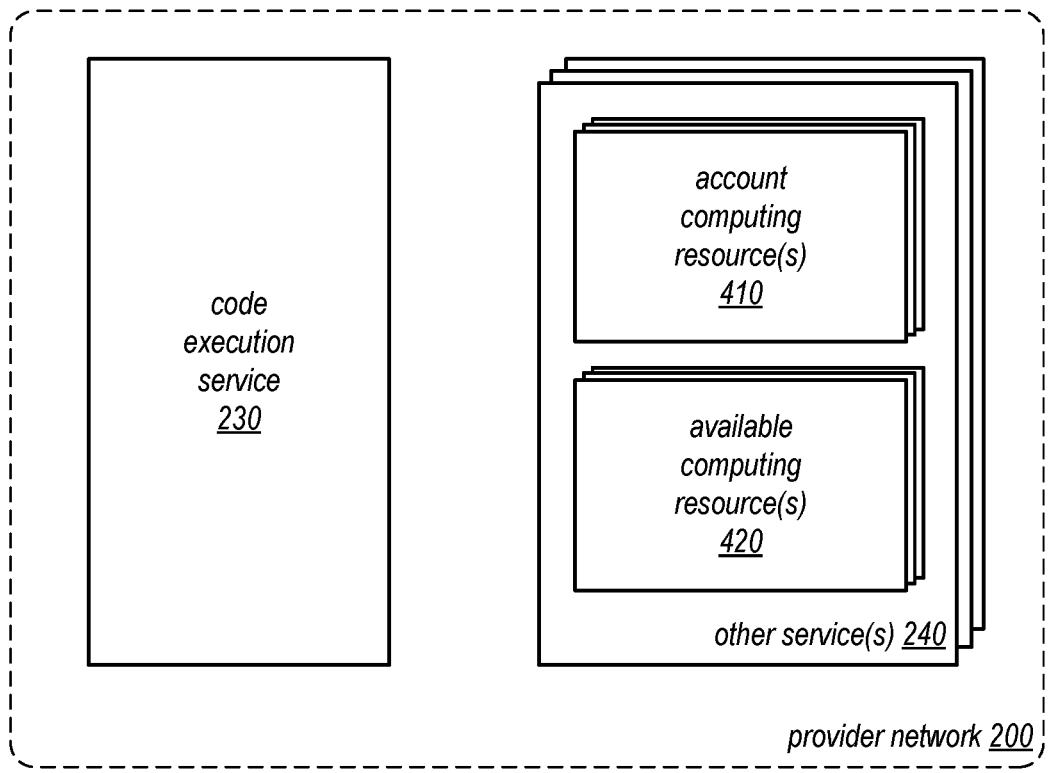
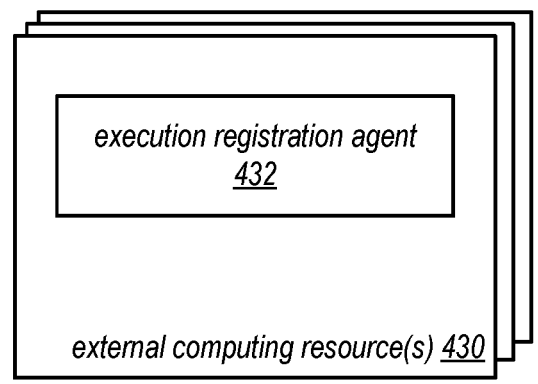
FIG. 4

DYNAMICALLY ROUTING CODE FOR EXECUTING

RELATED APPLICATIONS

This application is a continuation of U.S. patent application Ser. No. 15/385,784, filed Dec. 20, 2016, which claims benefit of priority to U.S. Provisional Application Ser. No. 62/426,584, filed Nov. 27, 2016, and which are incorporated herein by reference in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may execute programs on behalf of customers. Thus techniques for leveraging the power of distributed systems to perform operations on behalf users without burdening the users with provisioning, administrating, and managing tasks are desirable.

BRIEF DESCRIPTION OF THE DRAWINGS

FIG. 4 is a logical block diagram illustrating example computing resources that may be procured by a code execution service, according to some embodiments.

Figure 1:
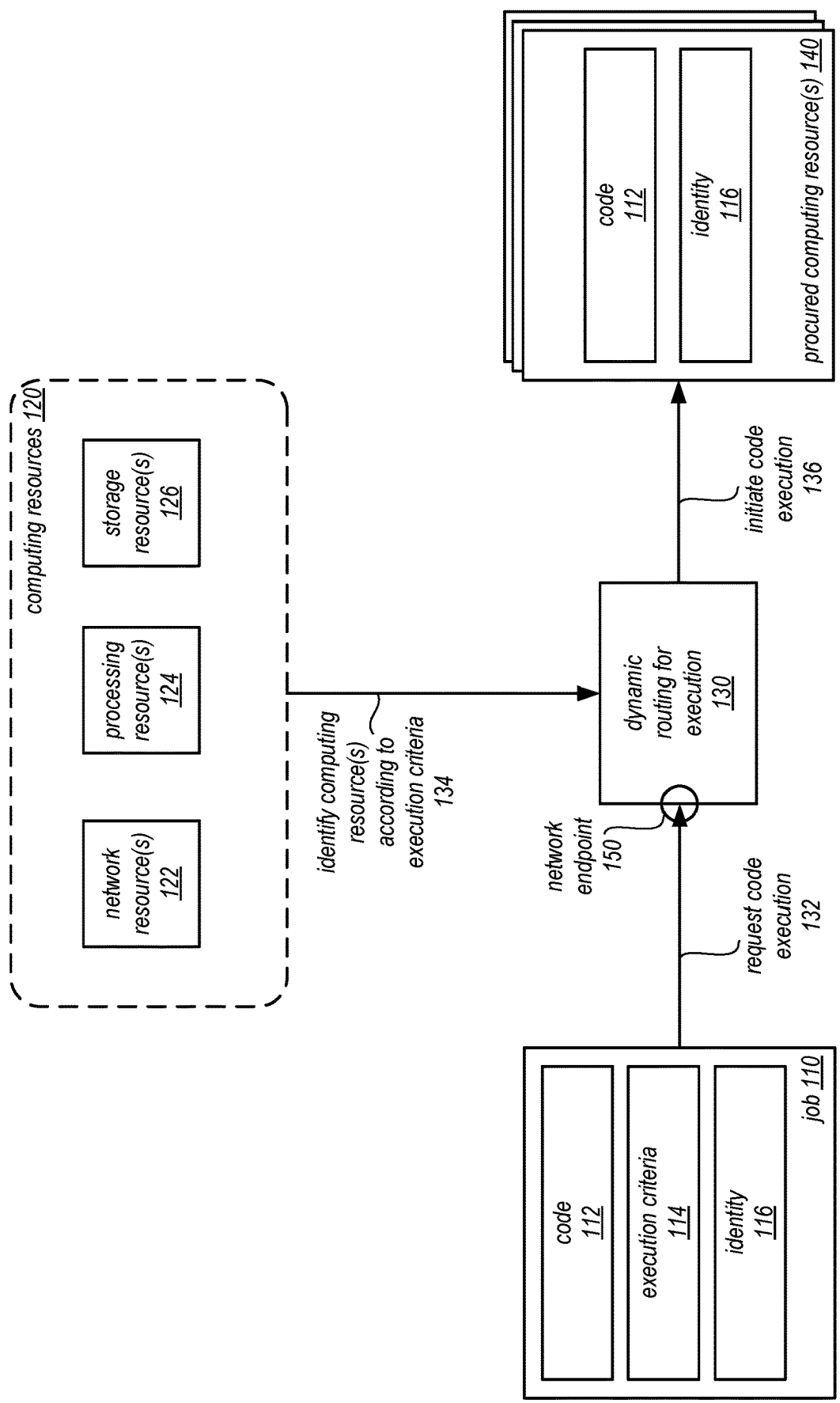
FIG. 1 illustrates a logical block diagram of dynamically routing code for execution, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of dynamically routing code for execution are described herein. Typically, computing services operate under a client-service paradigm that offers users a pre-defined set of operations or functionality in exchange for a managed experience, performing the pre-defined operations with little or no further input other than the initial invocation of the service. While this paradigm has allowed for powerful advances in performing certain tasks, the constrained opportunity to flexibly define the operations performed by computing services may force users to wait upon the development of a service that performs the tasks or operations needed by the user. In some circumstances, pre-defined operations or functionality may be inappropriate due to the number of unique or uncommon tasks or operations that may need to be performed. For example, when performing Extract, Transform, Load (ETL) processing, customized or highly-specified operations may be performed to extract data of a certain data format or data schema, transform the data into another data format or schema, and load the data into a desired location. Services that offer pre-defined operations or functionality may be unlikely to be developed to perform the exact transformations desired in the various combinations of ETL jobs that may be performed.

For scenarios like ETL processing, customized execution may be offer greater opportunities to perform the different types of operations or tasks desired. Therefore, execution platforms that allow for customized operations as may be defined by code provide users with the opportunity to leverage a distributed processing environment while implementing custom operations or tasks. However, the development and management burdens imposed by utilizing services that provide execution platforms without the other benefits of cloud or network-based service computing may offer little improvement to users overall experience executing custom tasks or operations.

Dynamically routing code for execution may provide a managed environment for custom operations or tasks defined and executed by code. Instead of users identifying, configuring, procuring, and managing resources to execute code, a code execution platform may be implemented that routes the execution of code to computing resources able to execute the code within execution criteria. FIG. 1 illustrates a logical block diagram of dynamically routing code for execution, according to some embodiments.

Dynamic routing for execution 130 may be implemented as part of managed code execution platform. A code execution request may be treated as a job 110 so that execution of provided code 112 is tracked, managed, scaled, completed, retried, or failed without client management or intervention. Code 112 may be source code, byte or other interpreted code, binary, machine or other executable code, or native code, managed or unmanaged code, or any other code that may be executed on behalf of a client that submits job 110. Job 110 may include execution criteria 114 which may include any configuration, requirement, or constraint that may be needed to execute the code. Some execution criteria 114 may be specified in terms of execution performance or computing resource performance. Execution criteria 114 may specify resource allocations (e.g., number of nodes, amount of persistent storage or memory, processor capacity, etc.), network configurations (e.g., secure or logically isolated network channels), isolation guarantees, software or hardware configurations or requirements, applications, virtualization platforms, or parallelization factors. Some execution criteria may be determined at dynamic routing for code execution 130 (e.g., based on the content of code 112). Job 110 may include identity 116 or other form of authorization/permission determination scheme.

Job 110 may be submitted as a request for code execution 132 to a network endpoint 150 for dynamic routing for code execution 130. Network endpoint 150 may be a network address, uniform resource locator (URL) or other location to invoke dynamic routing of job 110 to computing resources that satisfy execution criteria 114.

Dynamic routing for code execution 130 may identify 134 computing resource(s) 120 (e.g., servers, switches, computing nodes, storage devices, services, mobile devices, mainframes, or other hardware and/or software components) that may be procured for executing code 112 that satisfy the execution criteria 114 for code 112. For example, network resource(s) 122 may evaluated to determine whether a connection can be established with a data store. In another example, processing resource(s) 124 may be evaluated to identify a compute node running a virtualized operating system environment, a software container, that has processing capability above throughput or speed thresholds specified by the execution criteria 114. Storage resource(s) 126 may be evaluated, for example, to determine whether a particular type of storage device (e.g., solid state drive) is used for providing data storage. Such evaluations and many others may be performed with respect to execution criteria. Once computing resource(s) are found that satisfy the execution criteria, they may procured 140 (e.g., reserved, allocated, or configured). Then dynamic routing for code execution 130 may initiate or cause code execution at procured computing resource(s) 140, providing the code 112 for execution. In some embodiments, identity 116 may also be provided to ensure authorization for execution is permitted.

Please note that the previous description of dynamically routing code for execution is a logical illustration and thus is not to be construed as limiting as to the architecture for implementing a data store or ETL job processing.

This specification begins with a general description of a provider network that implements a code execution service that executes code received at the code execution service by dynamically routing execution of the code to computing resources that satisfy execution criteria for the code. Then various examples of the code execution service, including different components/modules, or arrangements of components/module that may be employed as part of implementing the code execution service are discussed. A number of different methods and techniques to implement dynamically routing code for execution are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
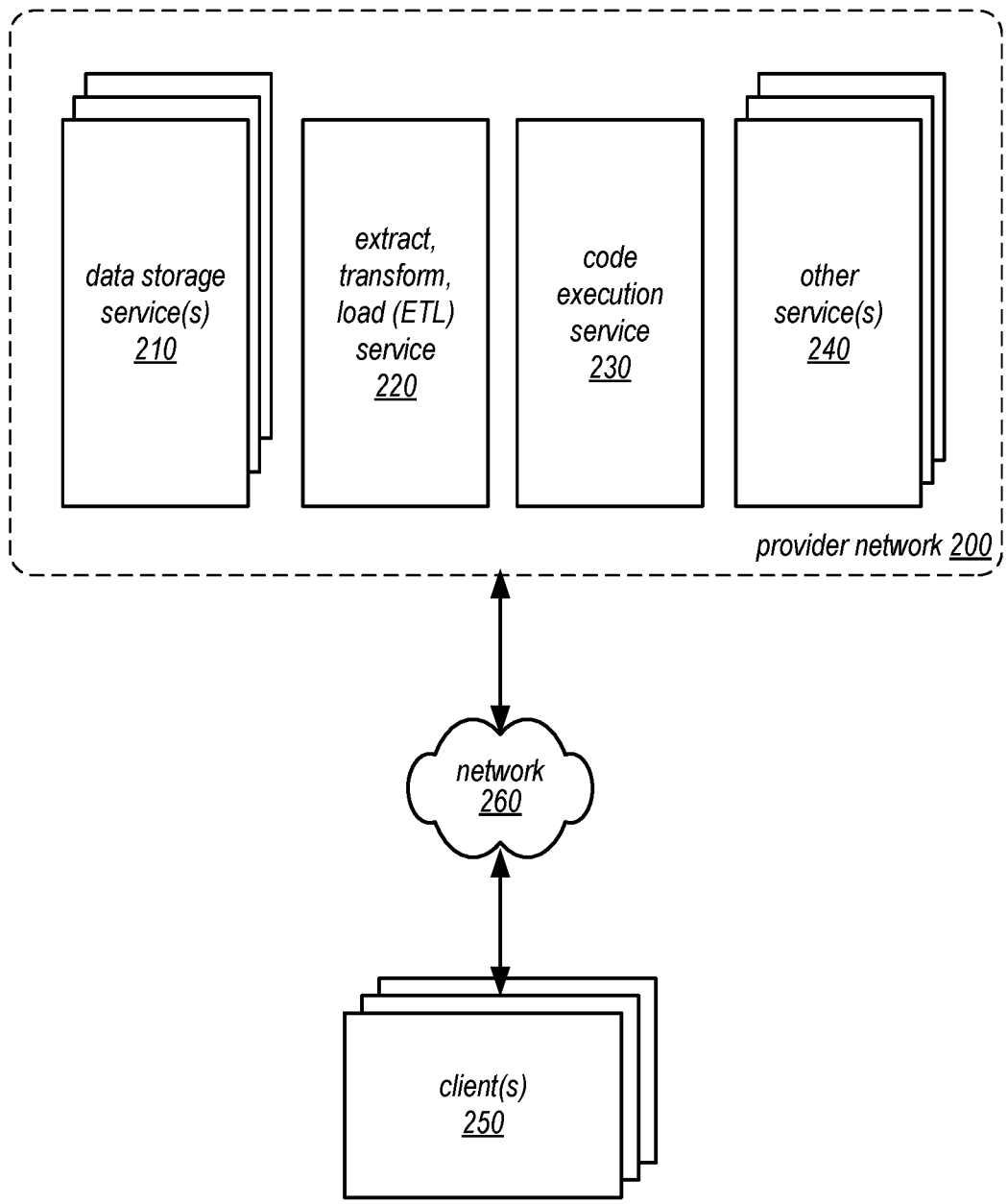
FIG. 2 is a block diagram illustrating a provider network offering different services including an extract, transform, load (ETL) service and a code execution service, according to some embodiments.

FIG. 2 is a block diagram illustrating a provider network offering different services including an extract, transform, load (ETL) service and a code execution service, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, provider network 200 may implement various computing resources or services, such as a data storage service(s) 210 (e.g., object storage services, block-based storage services, or data warehouse storage services), ETL service 220, code execution service 230 as well as other service(s) 240, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 210) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 210 may also include various kinds of object or file data stores for putting, updating, and getting data objects or files, which may include data files of unknown file type. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Figure 3:
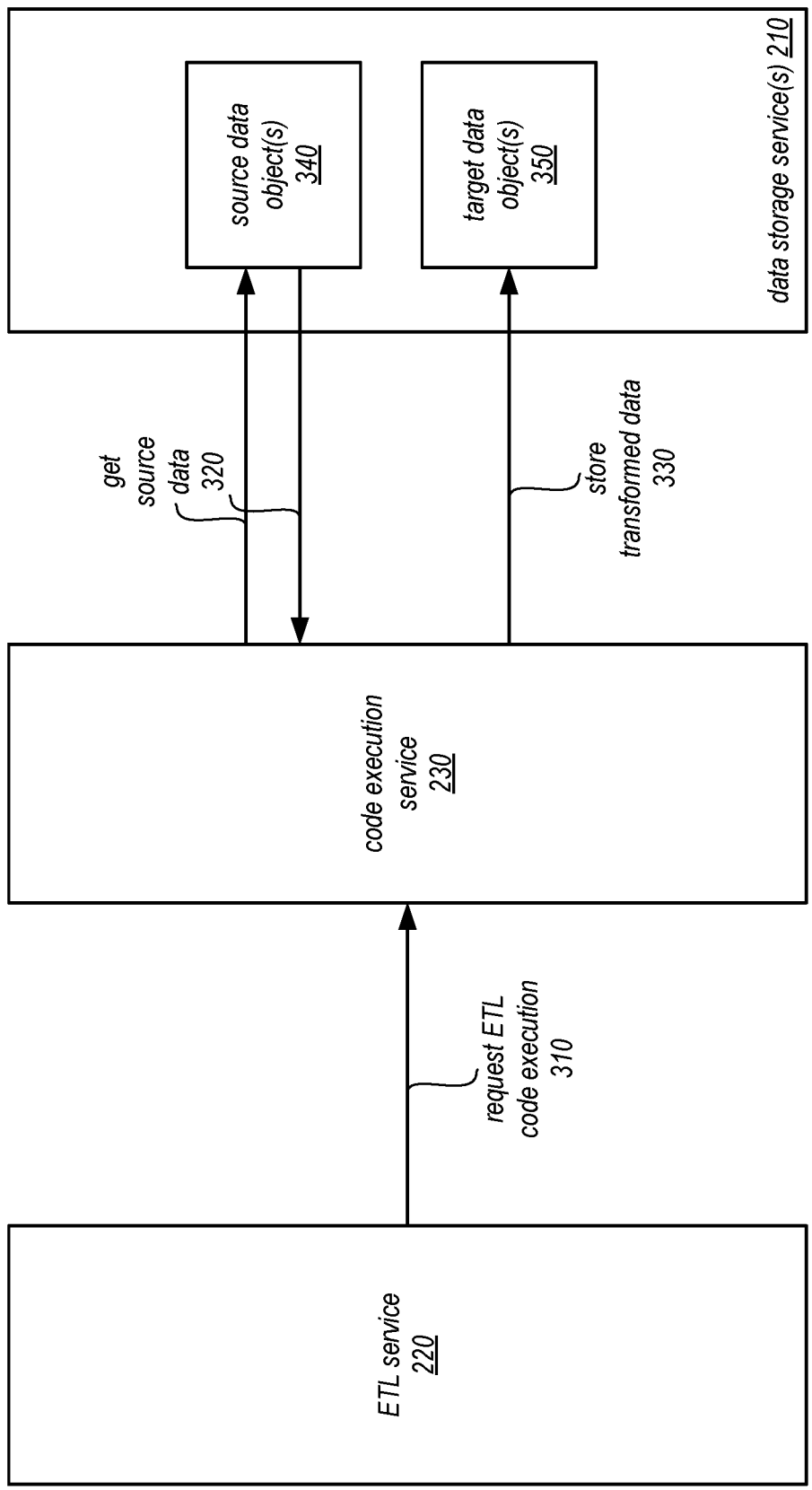
FIG. 3 is a block diagram illustrating an ETL service that performs ETL processing by submitting ETL code to a code execution service for execution, according to some embodiments.

In some embodiments, ETL service 220 may create and dynamically update a catalog of data stored on behalf of clients in provider network 200 across the various data storage services 210, as discussed in detail below with regard to FIG. 3. For example, a database stored in a non-relational database format may be identified along with container storing objects in an object-based data store as both being stored on behalf of a same customer of provider network 200. ETL service 220 may also perform ETL jobs that extract, transform, and load from one or more of the various data storage service(s) 210 to another location. For example, the ETL service may provide clients with the resources to create, maintain, and orchestrate data loading jobs that take one or more data sets, perform various transformation operations, and store the transformed data for further processing (e.g., by one or more of data processing service(s)). The ETL service may access a data catalog generated by ETL service 220 in order to perform an ETL operation (e.g., a job to convert a data object from one file type into one or more other data objects of a different file type).

Code execution service 230 executes code on behalf of clients. Code may be submitted to code execution service 230 via a network at a network endpoint that is not assigned or directed to any particular computing resource for executing code. The execution of code may be treated as a unit of work by code execution service 230, a task that is performed until completion (e.g., may be treated as an idempotent operation) and not subject time limits or other execution restrictions (unless execution of the code is determined to have or quit unexpectedly). Code execution service 230 may determine execution criteria for the code and may identify, procure, and direct execution of the code at computing resources that satisfy the execution criteria. FIGS. 4-9 discussed below provide more detailed discussion of code execution service 230.

Other service(s) 240 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 210. Various other distributed processing architectures and techniques may be implemented by data processing services (e.g., grid computing, sharding, distributed hashing, etc.). Note that in some embodiments, data processing operations may be implemented as part of data storage service(s) 210 (e.g., query engines processing requests for specified data). Data processing service(s) may be clients of ETL service 220 in order to invoke the execution of an ETL job to make data available for processing in a different location or data format for performing various processing operations with respect to data sets stored in data storage service(s) 210.

Generally speaking, clients 250 may encompass any type of client configurable to submit network-based requests to provider network 200 via network 260, including requests for storage services (e.g., a request to create, read, write, obtain, or modify data in data storage service(s) 210, a request to generate an ETL job at ETL service 220, a request to execute code at code execution service 230, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s) 210, operations, tasks, or jobs, being performed as part of code execution service 230 or other service(s) 240, or to interact with ETL service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Different kinds of clients may utilize a code execution service. From individual clients to large distributed services, code execution service 230 may provide a scalable execution platform that tailors execution of code according to the needs of the client. FIG. 3 is a block diagram illustrating an ETL service that performs ETL processing by submitting ETL code to a code execution service for execution, according to some embodiments. ETL Service 220 may implement create, manage and execute ETL jobs as well as a metadata store describing data objects stored in provider network 200, which may be called a data catalog.

ETL service 220 may maintain data catalogs that describe data objects (stored in provider network 200 or in external storage locations). ETL service 220 may identify unknown data objects, identify a data format for the unknown data objects and store the data format in a data catalog for the unknown data objects. ETL service 220 allow for catalog users, owners, or other stakeholders, to modify or otherwise manage data catalogs. For instance, ETL service 220 may process and execute access requests directed to data catalog(s) (e.g., requests to combine, delete, or split tables of metadata in the catalog or edit the metadata determined for a data catalog. ETL service 220 may implement access or control policies for data catalogs (e.g., to limit access to a data catalog to authorized users). ETL service 220 may implement data retention or life cycle policies to determine how long data catalogs (or older versions of data catalogs) are maintained. ETL service 220 may handle the provisioning of storage resources in data for creating new data catalogs. ETL service 220 may also perform load balancing, heat management, failure recovery, and other resource management techniques (e.g., implement data durability requirements) to ensure the availability of data catalogs for clients.

Storage for data catalog(s) may be implemented by one or more storage nodes, services, or computing devices (e.g., system 1000 discussed below with regard to FIG. 10) to provide persistent storage for data catalogs as part of ETL service 220. Such storage nodes (or other storage components of data catalog storage) may implement various query processing engines or other request handling components to provide access to data catalogs according to requests received via an interface for ETL service 220. For example, data catalog storage may be implemented as a non-relational database, in one embodiment, that stores file types and other metadata for data objects in table. In some embodiments, collections of metadata for various data objects stored across different storage service(s) 210 on behalf a single user account may be stored together in a single catalog of metadata that may be made accessible to clients.

ETL service 220 may provide clients with the ability to create ETL jobs through manual job creation (e.g., creating, edit, or uploading ETL code or creating or editing graphs of ETL jobs) or through automated job creation. ETL service 220 may handle requests for automated ETL job creation and manual ETL job creation. For example, ETL service 220 may receive job generation request which may specify the data object and target data format for an ETL job. Other job information, such as access credentials, triggering events, or any other information to execute an ETL job may be included as part of the creation request or as part of a trigger event registration request. ETL service 220 may automatically generate ETL code to perform an ETL job by determining the source data format of the data object and the target data format of the data object. For example, in one embodiment, the source and target data formats from a data catalog. In another embodiment, data format identification may perform data format recognition techniques, or access other data stores (e.g., such as a data catalog stored in relational database) to retrieve the data format information. ETL service 220 may then compare the source data format and target data format or schema to select transformations to apply to the source data object to achieve the target data format. ETL service 220 may then generate code for selected transformations and construct the source code for executing the selected transformations. The code for the ETL job may be stored in a job store for subsequent execution.

ETL service 220 may provide clients with the ability to manage, edit, delete, or otherwise change ETL jobs. Trigger events, may also be defined for ETL jobs. For example, trigger events may defined based on events, changes, modifications, or other occurrences with respect to source data objects, such as the creation of a new data object in a data store. Trigger events may also be defined based on the performance of ETL jobs, such as a success or failure event (which may be reported by code execution service 230). In this way, ETL jobs (or portions of ETL jobs) can handle both success and failure scenarios during execution without having to abort the entire ETL job. ETL service 220 may monitor for trigger events and request execution of ETL jobs. For example, ETL service 220 may utilize code execution service 230 to execute ETL jobs. ETL service 220 may send a request 310 to code execution service 230 to execute ETL code for an ETL job (e.g., the ETL code may be code for a portion or the entire ETL job). Code execution service 230 may determine execution criteria for the ETL code. For example, the ETL code may require a particular data processing engine, like Spark or MapReduce. Code execution service 230 may determine the necessary network connections to obtain source data object(s) 340 form data storage service(s) 210 as well as the network connection to create or access target data object(s) 350. For example, code execution service 230 may determine that a Java Database Connectivity (JDBC) connection is required to access source data object(s) 340 or may determine that source data object(s) 340 are stored within a virtual private network.

Once code execution service 230 has determined the execution criteria for the ETL code, then code execution service may identify computing resource(s), such as software container clusters, virtual compute instances, or servers to execute the ETL code and that satisfy the execution criteria. For example, computing resources with a Spark data processing engine may be identified as can computing resources with the JDBC connection to access source data objects. Code execution 230 may determine or configure computing resource(s) if no preconfigured computing resources satisfy the execution criteria. Code execution service 230 may then route execution of the ETL code to the procured computing resource(s) which may get source data 320 from source data object(s) 340 and apply one or more transformations executed by the ETL code in order to store transformed data 330 in target data object(s) 350.

FIG. 4 is a logical block diagram illustrating example computing resources that may be procured by a code execution service, according to some embodiments. As noted above code execution service 230 may utilize computing resources of other service(s) 240 in provider network 200. For example, code execution service 230 may reserve a pool or fleet of computing resources, making the pool or fleet computing resources available 420 for performing code execution tasks. In some embodiments, available computing resource(s) 420 may be preconfigured, as discussed below with regard to FIG. 9, to implement operating systems, data processing engines, network configurations, or other capabilities or attributes that may commonly satisfy execution criteria. If, for instance, code is typically submitted using one of a set number of programming languages, then available computing resources may be configured with processing engines or other applications that support the set number of programming languages.

Code execution service 230 may handle requests to execute code on behalf of clients that are associated with user accounts of provider network 200. As illustrated in FIG. 4, user account computing resource(s) 410 may also be made available for executing code on behalf of a client associated with the user account. For example, when a request to execute code is received, a user account associated with the client may be identified. A listing of resources that are available or in use may be provided to identify account computing resource(s) 410. In at least some embodiments, external computing resource(s) 430 may be used to execute by code execution service 230. For example, external computing resource(s) 430 may be on premise servers, services, or systems, other provider networks or publicly available computing services. External computing resource(s) 430 may implement an execution registration agent 432 which may provide the identity, location, associated accounts and/or capabilities of external computing resource(s) 430 to code execution service 230. Code execution service 230 may consider external computing resource(s) 430 when identifying computing resource(s) that satisfy the execution criteria for executing code.

Figure 5:
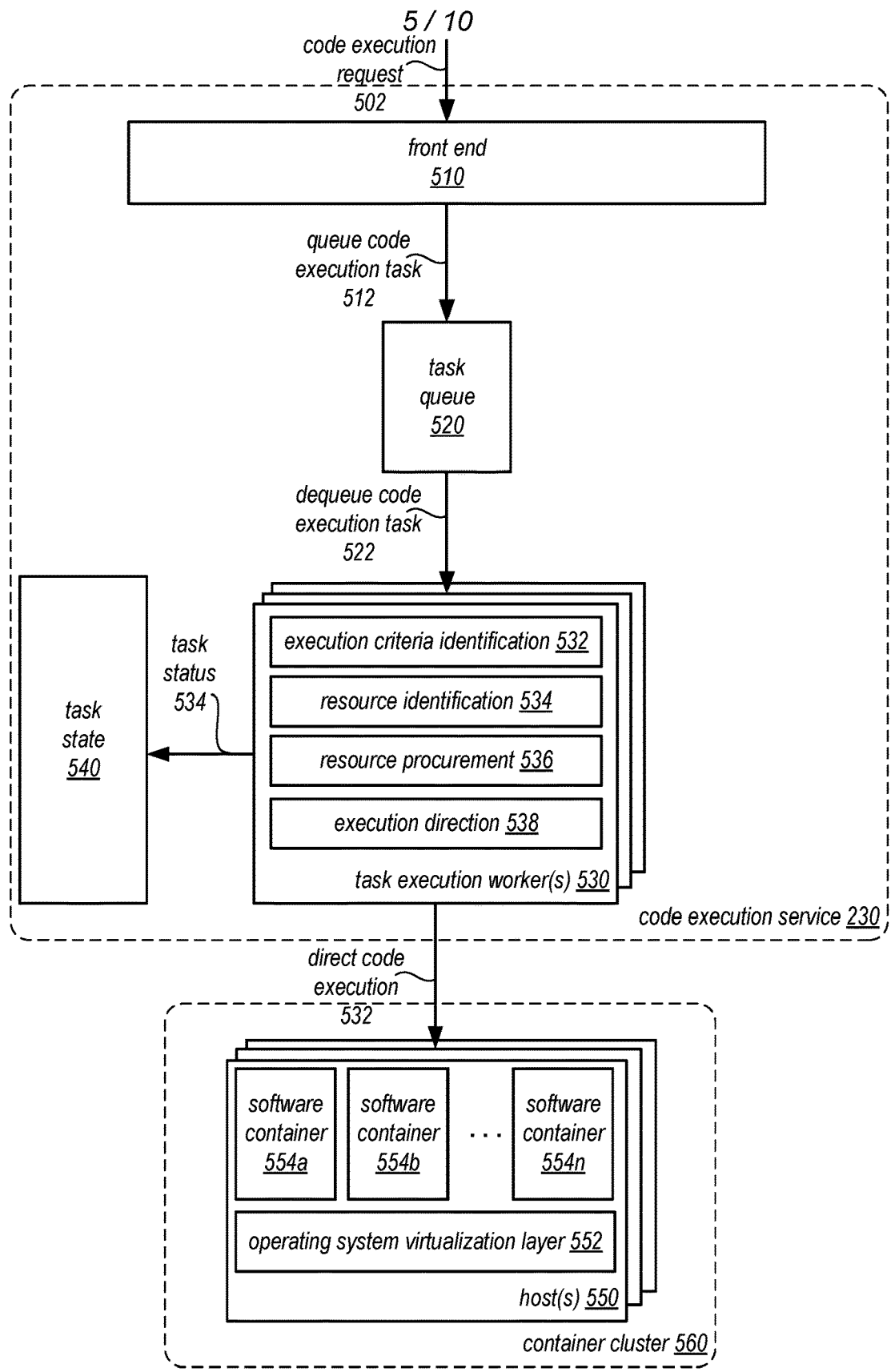
FIG. 5 is a logical block diagram illustrating a code execution service that implements dynamic routing of code for execution, according to some embodiments.

FIG. 5 is a logical block diagram illustrating a code execution service that implements dynamic routing of code for execution, according to some embodiments. Code execution service 230 may implement a programmatic interface (e.g., API) or graphical user interface (GUI) to allow for code execution requests 502 to be submitted to code execution service 230 via a network (e.g., network 260 in FIG. 2). Code execution service 230 may implement front end processing 510, which may handle code execution requests to prepare the execution of code included in code execution requests. For example, front end 510 may implement multiple computing nodes or servers to listen for code execution requests at one or more service endpoints (e.g., network addresses). When a request 502 is received at the service endpoint, a front compute node or server may parse the request, check for request validity, repack format, or organize data in the request (e.g., code, execution criteria, identity, etc.) and queue 512 or submit a task to execute the code task queue 520.

In at least some embodiments, code execution service may implement a fleet or pool of task execution worker(s) 530 which may perform a task to execute code submitted in a request 502. For example, task executioner worker(s) 530 may dequeue a code execution task 522 for processing. Task execution worker(s) 530 may implement execution criteria identification 532 to determine execution criteria for the code in the task. For example, execution criteria evaluation may unpack, locate, parse, or otherwise identify execution criteria submitted along with code execution request. Execution criteria identification 532 may also determine additional execution criteria for the request, in some embodiments, based on an evaluation of the code. For example, an execution graph or other determination of a plan for executing the code may be generated so that each node in the execution graph may be considered for determining execution criteria. Connections or interactions with data sources, for instance, may be evaluated to determine whether special network connection connections are required to gain accessed to an identified data store. Similarly, a cluster or group of nodes may be identified to determine execution criteria to implement parallel processing for at least a portion of the code.

Once execution criteria are determined, resource identification 534 may evaluate computing resources to identify those computing resource(s) that satisfy the execution criteria for executing the code. For example, as discussed above with regard to FIG. 4, a pool of preconfigured, available or otherwise reserved computing resources (e.g., implemented as part of other services like a virtual compute service, software container service, or other computing service 240) for code execution service may be considered. If any of the pool computing resource(s) satisfy the execution criteria, then the pool computing resource(s) may be identified. Similarly, computing resources associated with a user account (e.g., that submitted the code execution request 502) may be evaluated or external computing resources that have been registered or otherwise identified to code execution service 230 as available to execute the code. Computing resource evaluation may be performed by comparing resource capabilities, configurations, specifications, manifests, build files, other metadata with the determined execution criteria. If a resource can satisfy one, some or all of the execution criteria, then the computing resource may be identified. Resource names, identifiers, paths, pointers, or other locators may be collected while identifying computing resources and provided to resource procurement 536.

Resource procurement 536 may reserve, assign, or otherwise obtain rights to execute the code on identified resources. In those scenarios where identified resources are resources that have to be configured to satisfy the execution criteria, resource procurement 536 may submit configuration requests, initiate reboots, re-images, allocate, or otherwise perform operations to configure computing resources in order to satisfy the execution criteria. For example, resource procurement 536 may perform operations to establish network communication channels between private or logically isolated networks in order to provide communication from one computing resource to another. In another example, resource procurement 536 may obtain data storage or memory that satisfies performance criteria.

Once the identified resources are procured, then execution direction 538 may route, direct, or otherwise initiate the execution of the code at the procured computing resources. For example, as illustrated in FIG. 5, the identified resource(s) may be one or more host(s) 550 (e.g., a computing system, server, node, or devices like computing system 1000 in FIG. 10). Host(s) 550 may implement operating system virtualization layer 552 in order to provide virtualized operating system environments for different software containers 554*a*, 554*b*, and 554*n*. Execution direction 538 may direct code execution at one or more software container(s) 554, to implement a container cluster 560 for executing the code. For instance, one software container may be implemented as a leader, planner, or task manager for container cluster 560 to perform a root task, main function, or other operation, providing child or leaf tasks to other software containers 554.

Execution direction 538 may monitor the performance of host(s) 550 and/or software containers 554 to perform execution management functions, such as failure recovery (if a host or container fails), automatic cluster scaling (e.g., increasing or decreasing software containers procured for an execution task), heat management (e.g., performing, directing, or implementing load balancing amongst software container(s) 554, or any other execution resource management function. Execution direction 538 may update task status 534 in task state 540 to include states of "running" "paused" "error/failure," or "cancelled."

Task state 540 may store task status 534 as well as other task errors or events. In some embodiments, task state 540 may be a database or other storage system that may be queryable for particular tasks and data. The task state may provide the execution context of code at the computing resources, such as container cluster 560, so that in the event of failure, the execution context or runtime context of the code can be retrieved. Then, execution of the code can continue from the point at which the execution context was stored. In this way, the idempotency of code execution requests can be preserved. In at least some embodiments, a metric collection service or store may access task state (or receiving push notifications from task state 540) when changes to task status occur. In this way event logs for executing tasks may be maintained separately from hosts 550 or containers 554 so that event logs are not lost in the event of host or container failure.

Figure 6:
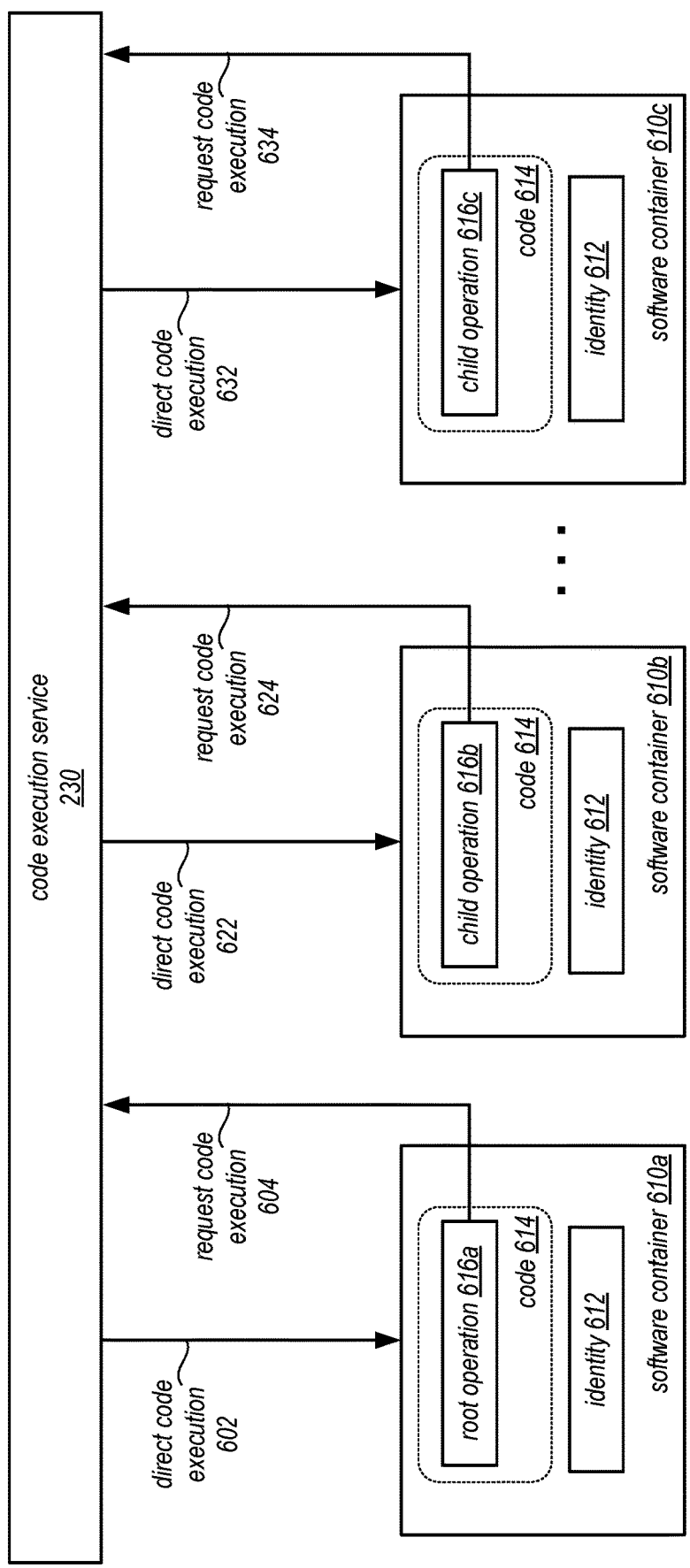
FIG. 6 is a logical block diagram illustrating preserving code execution identity across multiple computing resources executing code, according to some embodiments.

FIG. 6 is a logical block diagram illustrating preserving code execution identity across multiple computing resources executing code, according to some embodiments. For code executed in distributed environments (e.g., grid computing, cluster computing, etc.), authority to perform actions as part of executing the code (e.g., accessing data stores or particular data objects, sending API calls or commands to invoke other functions operations) may be needed to complete execution of the code. Typically, distributed execution environments utilize the authority or permissions attributed to the component executing the code (e.g., the permissions associated with a particular software container, virtual instance, or server). However, providing these resources with blanket permissions to ensure that code execution can complete may pose a security risk or even be unfeasible. Code execution service 230 may implement techniques to preserve the identity associated with executing code across different components executing the code so that permissions or authority is still limited to the actions performed as part of executing the code (and not any actions performed by an execution component).

In FIG. 6, for example, a first software container 610 may execute a portion of code 614, a root operation 616*a* which may act using the authority of identity 612 which is provided by code execution service 230 when directing execution 602 at software container 610*a*. In the course performing root operation 616*a*, one or more child operations may be invoked. Instead of directly passing the operations for execution at another component, software container 610*a* may submit an execution request 604 for the child operation portion of code 614. As discussed below with regard to FIG. 7, identity may be provided as part of submitting an execution request and used to provide the authority or permission for executing the code. Thus, code executions service 230 when directing code execution 622 for the child operation 616*b* of code 614, software container 610*b* may receive the same identity 612 as provided to software container 610*a*. This pattern may continue so that subsequent requests for execution of other child operations 624 or 634 (whether from software containers 610*b* or 610*c* or another child operation invoked by software container 610*a*) may provide the same identity to code execution service so that when another child operation (e.g., 616*c*) is executed, the identity 612 may be included when directed 632 to execute the child operation 616*c*.

Figure 7:
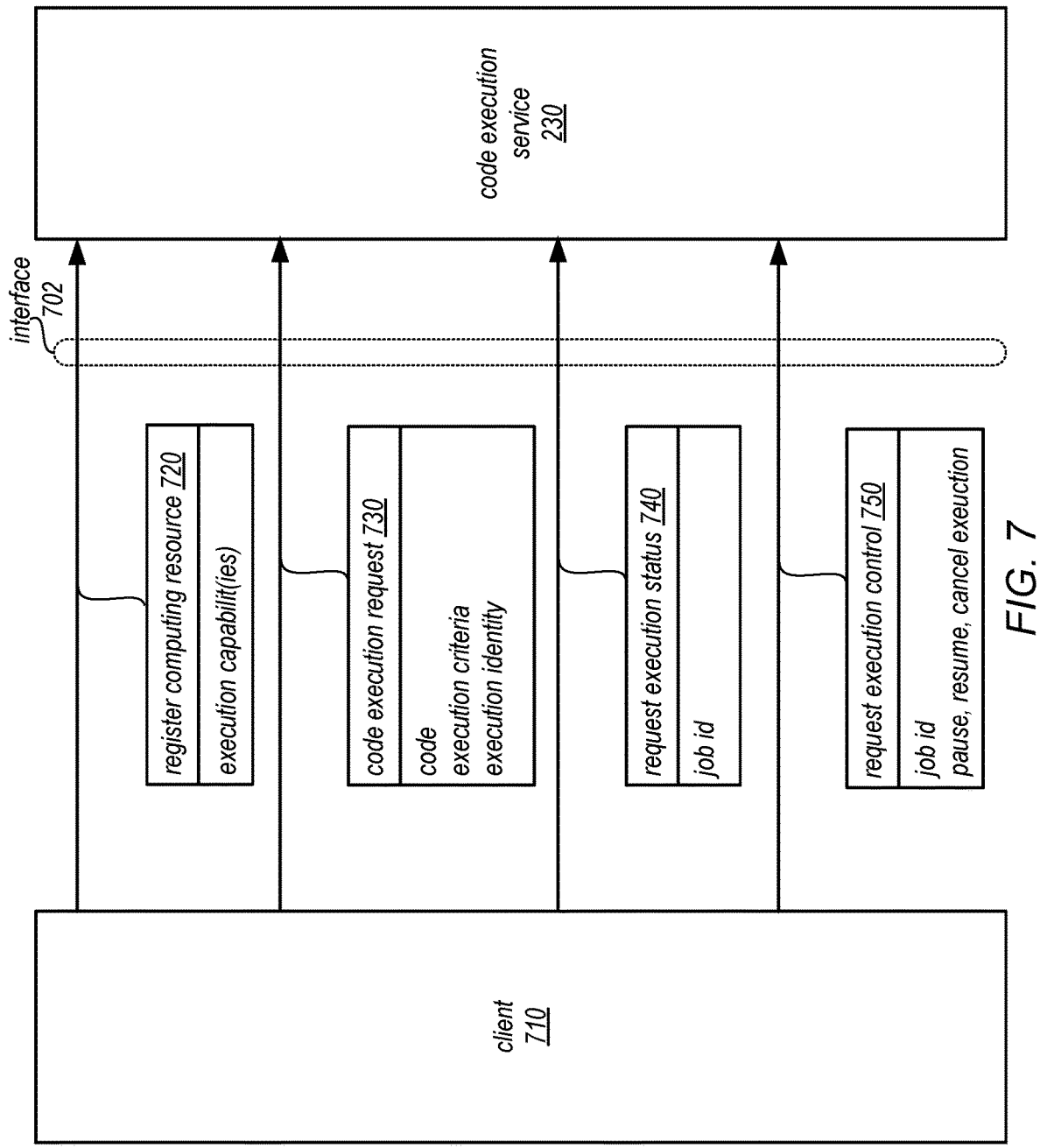
FIG. 7 illustrates example interactions between a client and code execution service, according to some embodiments.

FIG. 7 illustrates example interactions between a client and code execution service, according to some embodiments. Interface 702 may be a network-based, graphical, and/or programmatic interface (e.g., API), that allows clients, such as client 710 (which may be similar to clients 250 discussed above with regard to FIG. 2), access to code execution service 230. Client 710 may submit a request to register a computing resource 720 for execution of code, in some embodiments. For example, an on premise server (or fleet of servers) may be identified as available for executing code according to specified execution capabilities (e.g., capable of performing certain calculations, storage operations, or other tasks that may be invoked by the code).

Client 710 may submit a request via interface 702 that is a code execution request 730. Code execution request 730 may include the code to be executed (or pointer or location of where the code can be retrieved), one or more execution criteria, and an identity or other access/authorization credential for executing the code. Client 710 may submit a request via interface 702 to obtain the execution status of an execution job for code. The executions status request 740 may include an identifier or other information to determine which code execution job's status to return. Client 710 may submit a request to control 750 the execution of a code execution job. For example, request 750 may identify the code execution job (e.g., job identifier) and may include a command to pause, resume, or cancel execution of the code execution job, in some embodiments.

Figure 8:
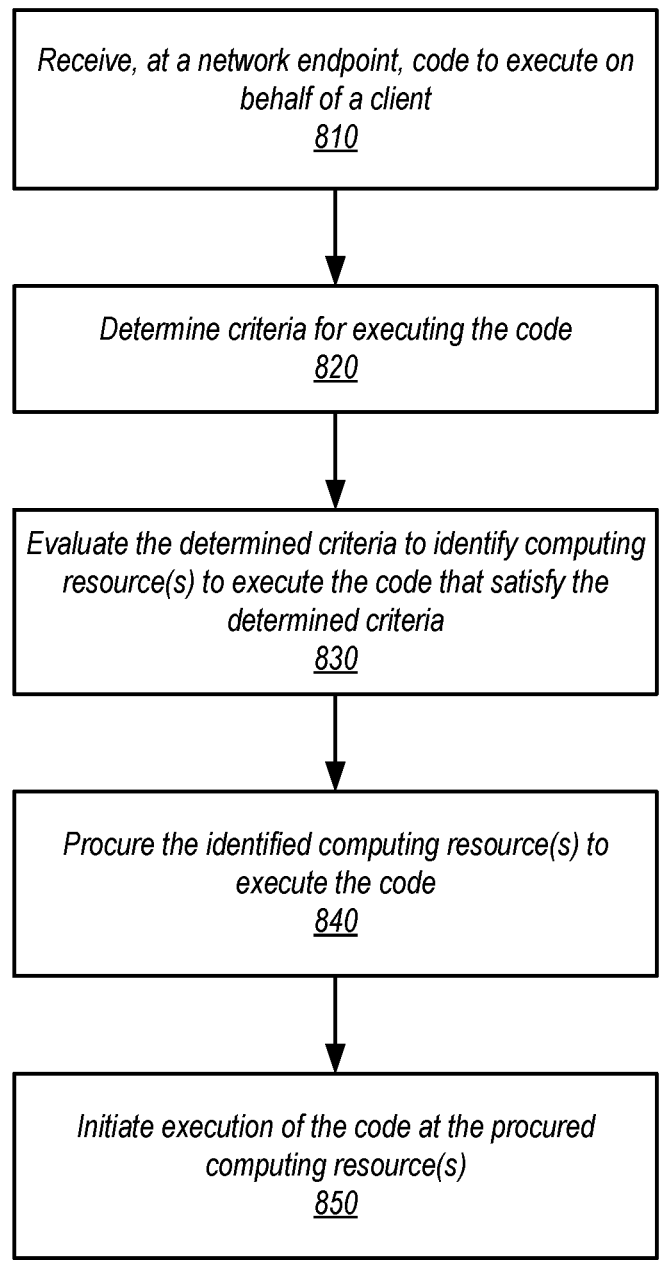
FIG. 8 is a high-level flowchart illustrating methods and techniques to implement dynamically routing code for execution, according to some embodiments.

Although FIGS. 2-7 have been described and illustrated in the context of a code execution service, the various techniques and components illustrated and described in FIGS. 2-7 may be easily applied to other execution platforms that have access to computing resources for executing code in different embodiments. As such, FIGS. 2-7 are not intended to be limiting as to other embodiments of a system that may implement dynamic routing of code for execution. FIG. 8 is a high-level flowchart illustrating methods and techniques to implement dynamically routing code for execution, according to some embodiments. Various different systems and devices may implement the various methods and techniques described below, either singly or working together. For example, a code execution service such as described above with regard to FIGS. 2-7 may be configured to implement the various methods. Alternatively, a combination of different systems and devices, such as a job execution service implemented as part of another system (e.g., an ETL system, am image processing system, etc.) that executes code submitted for execution. Therefore, the above examples and or any other systems or devices referenced as performing the illustrated method, are not intended to be limiting as to other different components, modules, systems, or configurations of systems and devices.

As indicated at 810, code may be received at a network endpoint for execution on behalf a client. The code may be source code, byte or other interpreted code, binary, machine or other executable code, or native code, managed or unmanaged code, or any other code that may be executed on behalf of the client. The network endpoint may, as noted above, be a service or dispatch endpoint that is not associated with any particular code to be executed or computing resources to be used to execute the code. Multiple clients may submit code for execution to the same network endpoint for execution, which are dynamically routed to different computing resources for execution. The code may be formatted as an execution job request and may include other information, such as execution criteria, access credentials or other identity information for executing the code.

In response to receiving the code for execution, criteria for executing the code may be determined, as indicated at 820. Execution criteria may include any configuration, requirement, or constraint that may be needed to execute the code. Some execution criteria may be specified in terms of execution performance (e.g., target completion time or throughput rate) or computing resource performance (e.g., X memory access rate, Y network speed, Z processing speed). Execution criteria may specify resource allocations (e.g., number of nodes, amount of persistent storage or memory, processor capacity, etc.), network configurations (e.g., secure or logically isolated network channels), isolation guarantees, software or hardware configurations or requirements, applications, virtualization platforms, or parallelization factors. Various other execution criteria may be determined, and thus the previous examples are not intended to be limiting.

The request to execute the code may include the execution criteria, in some embodiments, or the execution criteria may be determined, for instance, based on the code, in some embodiments. If the code is submitted in a certain programming language or format, utilizes particular software libraries or drivers, then an execution criteria may be determined that identifies an execution engine that supports the programming language of the code and offers the libraries or drivers, then the execution engine may be determined as an execution criteria. Data sources or other code dependencies, including other services, systems, or devices invoked by the code may also be identified as execution criteria. For example, one or multiple different dependent systems or devices may be located in different private networks. An execution criteria may be determined that identifies the connections among the private networks needed to facilitate execution of the code (e.g., to transfer data from one location to another).

Figure 9:
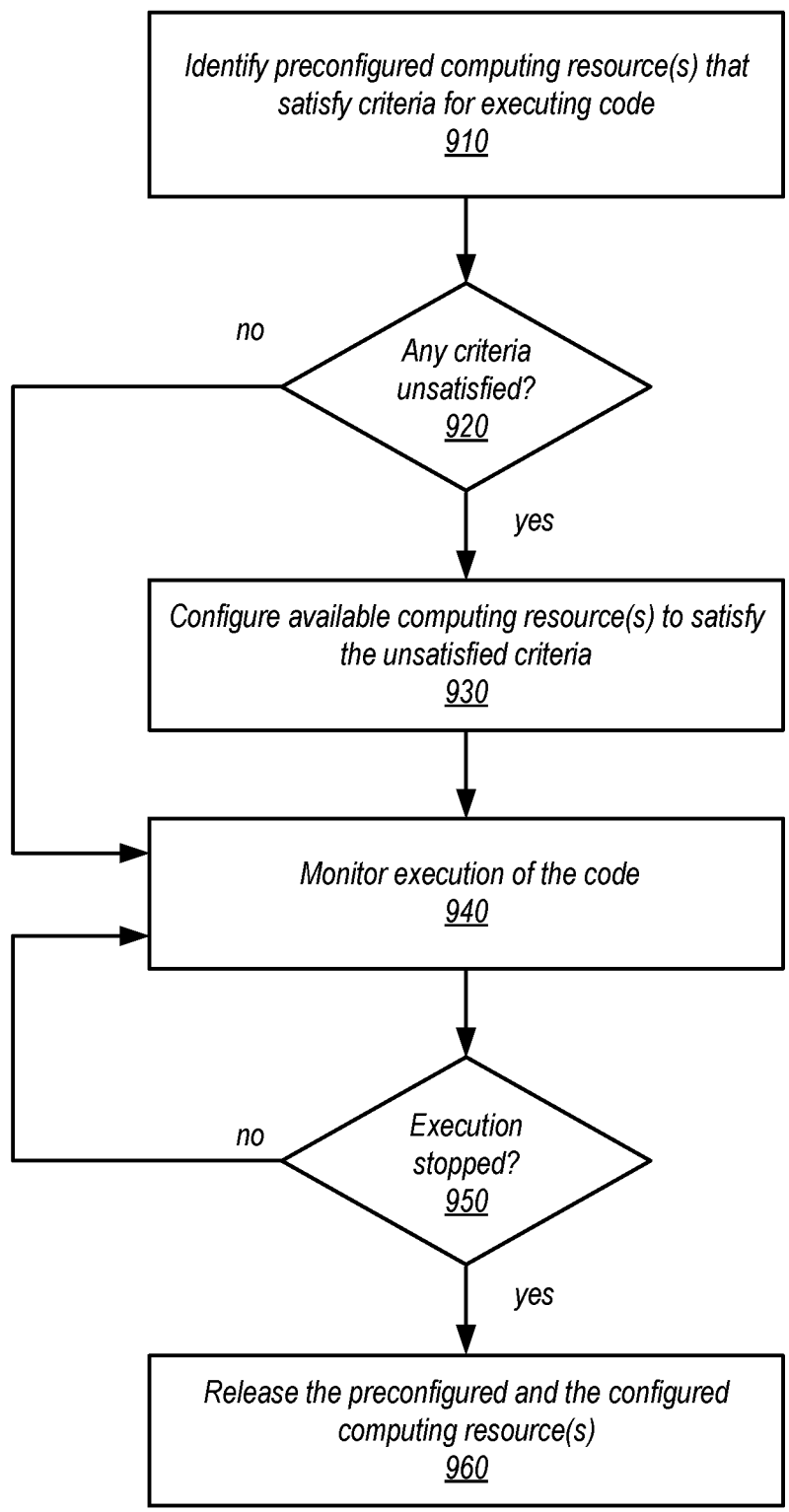
FIG. 9 is a high-level flowchart illustrating methods and techniques to procure and release computing resources for executing code on behalf of a client, according to some embodiments.

Once the criteria for execution are determined, the criteria may be evaluated to identify computing resources to execute the code that satisfy the determined criteria, as indicated at 830. Computing resources may be any combination of one or more computing systems or devices that implement or provide access to resources (e.g., access to storage devices) for executing the code. For example, a computing resource may be a server, virtual instance, or software container with performance or other attributes that can execute the code. To identify computing resource(s), a listing of computing resources may be assembled and compared with the determined criteria. Related execution criteria that may be satisfied together by the same computing resource may be determined. FIG. 9 provides further examples of identifying computing resource(s), including computing resources that need to be configured in order to satisfy the execution criteria.

As indicated at 840, once identified the computing resource(s) may be procured to execute the code. For example, a reservation request, reboot command, provision or allocate operation may be executed to obtain control over at least a portion of the identified computing resource(s) in order to execute the code. In this way, execution of the code may be directed to the identified computing resource(s). As indicated at 850, execution of the code may then be initiated. For instance, the code may be provided to a single computing resource or cluster of computing resource(s) (e.g., to a task or execution manager for the cluster). The input arguments, and any other information, such as identity (as discussed above with regard to FIG. 6) may be passed to the computing resources. Once initiated, execution of the code may continue without further direction from the client (unless the client modifies execution of the code, as discussed above with regard to FIG. 7). Computing resources may be automatically scaled as needed (e.g., in order to meet execution criteria) or replaced or repaired in the event of failure.

Procuring resources may be performed by evaluating computing resources that are procurable to execute received code. Some computing resources are reserved, associated with or linked to a client that submitted the request to execute the code, while other computing resources may be discovered, provisioned, or otherwise made available to execute the code. FIG. 9 is a high-level flowchart illustrating methods and techniques to procure and release computing resources for executing code on behalf of a client, according to some embodiments.

As indicated at 910, preconfigured computing resource(s) may be evaluated to identify those computing resources that satisfy criteria for executing the code. For example, preconfigured computing resources may be maintained or reserved for a user account or the client that submitted the code for execution or preconfigured computing resources may be computing resources maintained for executing code with certain execution criteria. A profile, settings, index, manifest, or other set of descriptive information describing the pre-configured computing resource(s) may be compared with execution criteria. If, for instance, the execution criteria indicate a particular processing engine, such as Spark or MapReduce, the descriptive information for preconfigured resource(s) may be examined to see if Spark or MapReduce is implemented on the preconfigured resource(s). Similar evaluations may be made for different execution criteria. For example, network criteria that identify needed storage connection capabilities (e.g., JDBC or ODBC) or network access (e.g., membership in a logically isolated network, such as a virtual private network) may be performed. Other capabilities, such as storage capacity, memory speed or capacity, networking speed or capacity, processor speed or capacity may be compared with execution criteria for storage performance, memory performance, networking performance, or processor performance.

In some scenarios, preconfigured resource(s) may be sufficient to execute the received code. However, in some circumstances, preconfigured computing resource(s) may meet none or only some of the execution criteria. Thus, as indicated at 920, if some of the criteria are unsatisfied, then available computing resource(s) may be configured to satisfy the unsatisfied criteria, as indicated at 930, in some embodiments. For example, if the code accesses a data object stored in a data store within a virtual private network, then available computing resource(s) may be configured to connect to the virtual private network using access credentials supplied for executing the code (e.g., in the request to execute the code). Once configured to connect to the virtual private network and the data store within, the computing resource(s) may then satisfy the criteria of establishing a connection with the data store within the virtual private network. Other configurations may be performed. For instance, specific versions of operating systems, virtualization systems (e.g., computer virtualization or operating system virtualization), storage engines, processing engines, applications, drivers, software images, or other information may be configured to execute on computing resource(s) in order to satisfy the execution criteria.

Once resources are procured for executing the code, the execution of the code may be monitored, as indicated at 940. For example, a status request message (such as execution status request 740 in FIG. 7 above) may be sent to determine the state of execution for the code (e.g., running, paused, failed, cancelled, or completed). If execution has stopped, as indicated by the positive exit from 950, then the preconfigured and/or configured computing resource(s) for executing the code may be released, as indicated at 960. For example, each procured computing resource(s) may be pinged to determine if execution at the resource (e.g., any threads, processes, storage writes, suspended transactions, etc.) still remaining after execution has stopped. If not, then kill commands, resets, reboots, releases, and other operations may be performed to halt execution of remaining processing at the resource. Memory, storage, networking, or processing capacity allocated to the stopped code may be released or made available for other uses. In some scenarios, releasing computing resource(s) may include triggering uninstall, shutdown or reboot techniques to return the computing resource to a baseline configuration.

If execution of the code fails (e.g., due to a failure external to the code, such as missing data object, incorrect credentials, connection failure, etc.), a failure notification may be provided to a subscriber (which may be the client that requested execution of the code). The failure notification may be used to trigger the execution of the same or different code. For example, the code may be executed as part of a larger job or operation. If the execution for one part of the job fails, then a failure handling task may be initiated (instead of failing the execution of the larger job). In scenarios where jobs or operations are long running, like the ETL jobs discussed above with regard to FIG. 4, failure handling may allow the job to eventually complete successfully without starting over.

Some failures can be recovered from so that execution of the code can continue. For example, the state of the execution information collected as part of monitoring the code (at element 940) may include runtime or execution context (e.g., register values, memory content, etc.) that can be used to restart execution of the code at a last known state, in some embodiments. When a failure occurs (e.g., at a host executing part of the code), then the execution state of the code can be accessed to restart execution of the code (e.g., at the same or different computing resources).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
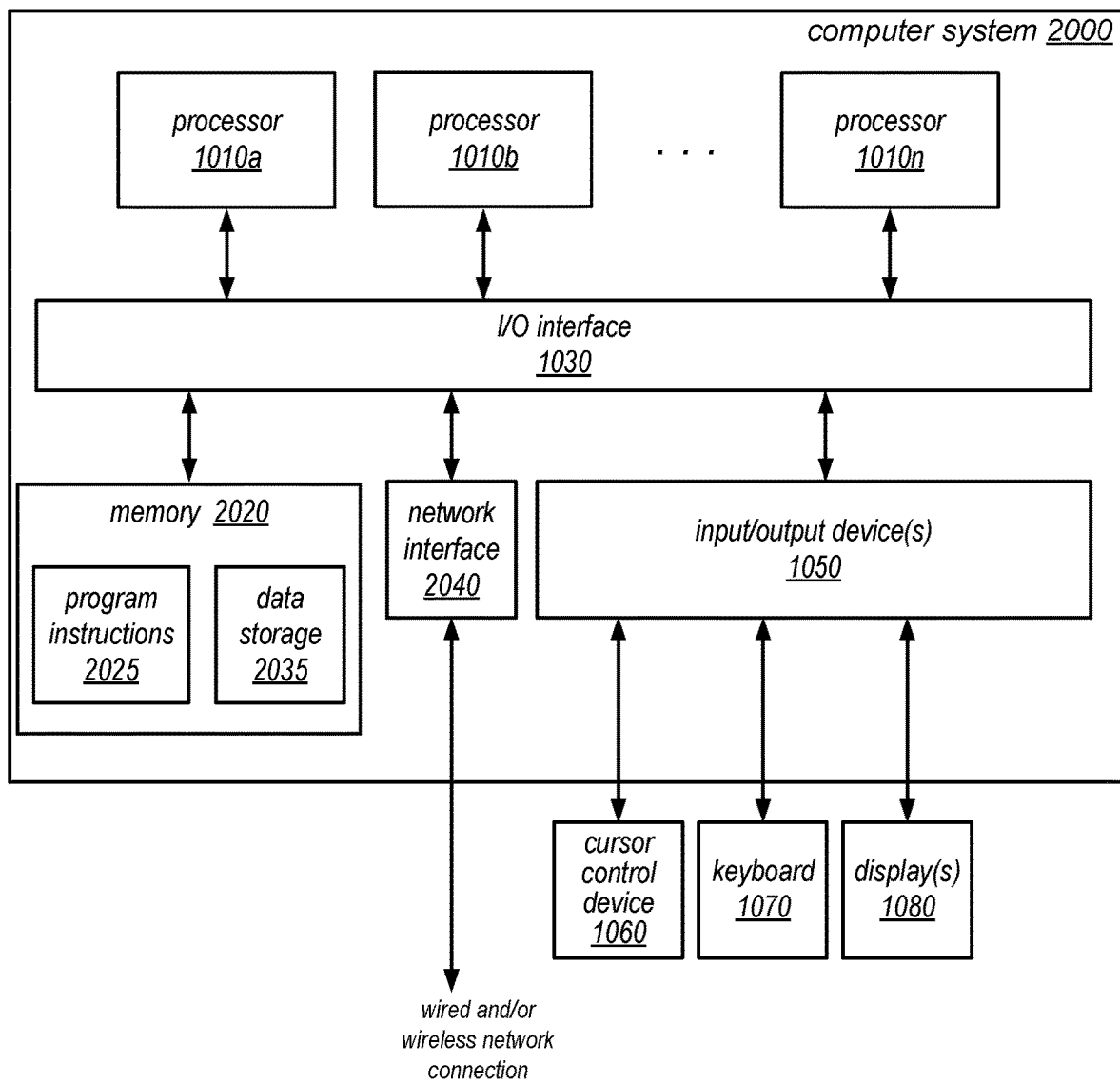
FIG. 10 illustrates an example system configured to implement the various methods, techniques, and systems described herein, according to some embodiments.

Embodiments of dynamically routing code for execution as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a code execution system may present code execution services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
   receive, at a network endpoint, source code of a job to transfer data from a data source to a on behalf of a client;
   in response to the receipt of the source code:
   evaluate the job to determine a criteria for the request to execute the source code, wherein the evaluating comprises:
   identify use of one or more Graphics Processing Unit (GPUs) that are utilized via one or more application programming interfaces (APIs) as part of executing the source code and identifying that a driver is used to interact with the one or more GPUs in order to execute the source code;
   evaluate respective capabilities of available computing resources with respect to the determined criteria to identify one or more computing resources from the available computing resources with the respective capabilities to execute the source code that satisfy the determined criteria including one or more GPUs;
   procure the identified one or more computing resources with the respective capabilities to execute the source code, wherein the procuring causes configuration of a software image for a software container that implements operating system virtualization at the identified one or more computing resources to use the driver to interact with the one or more GPUs via the one or more APIs to execute the source code; and
   initiate execution of the source code at the procured computing resources.

2. The system of claim 1, wherein the memory stores further program instructions that when executed by the at least one processor further cause the at least one processor to:
   determine that execution of the code has failed; and
   provide a failure notification for the code to the client.

3. The system of claim 1, wherein an additional criteria is determined that includes a network configuration.

4. The system of claim 1, wherein the memory stores further program instructions that when executed by the at least one processor further cause the at least one processor to:
   receive a request to cancel execution of the code; and
   cancel execution of the code at the at the procured computing resources.

5. The system of claim 1, wherein the identified computing resources are a cluster of computing resources, wherein at least one of the computing resources is a multi-tenant computing resource available for executing different source code, wherein procuring the identified computing resources to execute the source code comprises configuring a logically isolated network amongst the cluster of computing resources.

6. The system of claim 1,
   wherein the memory stores further program instructions that when executed by the at least one processor further cause the at least one processor to receive an identity for the client associated with one or more operational permissions; and
   wherein to initiate execution of the source code at the procured computing resources, the program instructions cause the at least one processor to provide the identity for the client to the procured computing resources.

7. The system of claim 1, wherein the at least one processor and the memory are implemented as part of a network-based service and wherein the source code is received at the network endpoint via a network-based interface for the network-based service.

8. A method, comprising:
receiving, at a network endpoint, source code of a job to execute on behalf of a client;
in response to receiving the source code:
evaluating the job to determine a criteria for the request to execute the source code, wherein the evaluating comprises:
identifying use of one or more Graphics Processing Unit (GPUs) that are utilized via one or more application programming interfaces (APIs) as part of executing the source code and identifying that a driver is used to interact with the one or more GPUs in order to execute the source code;
evaluating respective capabilities of available computing resources with respect to the determined criteria to identify one or more computing resources from the available computing resources with the respective capabilities to execute the source code that satisfy the determined criteria including one or more GPUs;
procuring the identified one or more computing resources with the respective capabilities to execute the source code, wherein the procuring causes configuration of a software image for a software container that implements operating system virtualization at the identified one or more computing resources to use the driver to interact with the one or more GPUs via the one or more APIs to execute the source code; and
initiating execution of the source code at the procured computing resources.

9. The method of claim 8, further comprising:
determining that execution of the code has failed; and
providing a failure notification for the code to the client.

10. The method of claim 8, wherein an additional criteria is determined that includes a network configuration.

11. The method of claim 8, further comprising:
receiving a request to cancel execution of the code; and
canceling execution of the code at the at the procured computing resources.

12. The method of claim 8, wherein the identified computing resources are a cluster of computing resources, wherein at least one of the computing resources is a multi-tenant computing resource available for executing different source code, wherein procuring the identified computing resources to execute the source code comprises configuring a logically isolated network amongst the cluster of computing resources.

13. The method of claim 8,
wherein the method further comprises receiving an identity for the client associated with one or more operational permissions; and
wherein initiating execution of the source code at the procured computing resources comprises providing the identity for the client to the procured computing resources.

14. The method of claim 8, wherein the source code is received at the network endpoint via a network-based interface for a network-based service of a provider network and wherein the procured computing resources are implemented as part of the network-based service or another network-based service of the provider network.

15. One or more non-transitory, computer-readable storage media, storing program instructions that when executed on or across one or more computing devices, cause the one or more computing devices to implement:
receiving, at a network endpoint, source code of a job to transfer data from a data source to a on behalf of a client;
in response to receiving the source code:
evaluating the job to determine a criteria for the request to execute the source code, wherein the evaluating comprises:
identifying use of one or more Graphics Processing Unit (GPUs) that are utilized via one or more application programming interfaces (APIs) as part of executing the source code and identifying that a driver is used to interact with the one or more GPUs in order to execute the source code;
evaluating respective capabilities of available computing resources with respect to the determined criteria to identify one or more computing resources from the available computing resources with the respective capabilities to execute the source code that satisfy the determined criteria including one or more GPUs;
procuring the identified one or more computing resources with the respective capabilities to execute the source code, wherein the procuring causes configuration of a software image for a software container that implements operating system virtualization at the identified one or more computing resources to use the driver to interact with the one or more GPUs via the one or more APIs to execute the source code; and
initiating execution of the source code at the procured computing resources.

16. The one or more non-transitory, computer-readable media of claim 15, storing further program instructions that when executed on or across the one or more computing devices, cause the one or more computing devices to further implement:
determining that execution of the code has failed; and
providing a failure notification for the code to the client.

17. The one or more non-transitory, computer-readable media of claim 15, wherein an additional criteria is determined that includes a network configuration.

18. The one or more non-transitory, computer-readable media of claim 15, wherein the identified computing resources are a cluster of computing resources, wherein at least one of the computing resources is a multi-tenant computing resource available for executing different source code, wherein procuring the identified computing resources to execute the source code comprises configuring a logically isolated network amongst the cluster of computing resources.

19. The one or more non-transitory, computer-readable media of claim 15,
wherein the one or more non-transitory, computer-readable storage media storing further program instructions that when executed on or across the one or more computing devices, cause the one or more computing devices to further implement receiving an identity for the client associated with one or more operational permissions; and
wherein, in initiating execution of the source code at the procured computing resources, the program instructions cause one or more computing devices to implement providing the identity for the client to the procured computing resources.

20. The one or more non-transitory, computer-readable media of claim 15, wherein the one or more computing devices are implemented as part of a network-based service of a provider network and wherein the source code is received at the network endpoint via a network-based interface for the network-based service.

\* \* \* \* \*